US008225177B2

United States Patent
Krause

(10) Patent No.: US 8,225,177 B2
(45) Date of Patent: Jul. 17, 2012

(54) PROGRESSIVELY PROGRAMMING FLASH MEMORY WHILE MAINTAINING CONSTANT ERROR CORRECTION CODES

(75) Inventor: Paul William Krause, Sugar Land, TX (US)

(73) Assignee: Texas Instruments Incorporated, Dallas, TX (US)

( * ) Notice: Subject to any disclaimer, the term of this patent is extended or adjusted under 35 U.S.C. 154(b) by 870 days.

(21) Appl. No.: 12/345,312

(22) Filed: Dec. 29, 2008

(65) Prior Publication Data

US 2010/0169744 A1 Jul. 1, 2010

(51) Int. Cl.
*G11C 29/42* (2006.01)
*G11C 29/56* (2006.01)
(52) U.S. Cl. ........................ 714/763; 714/758
(58) Field of Classification Search .................. None
See application file for complete search history.

(56) References Cited

U.S. PATENT DOCUMENTS

| 3,568,153 | A * | 3/1971 | Kurtz et al. ............ 714/764 |
| 6,839,875 | B2 * | 1/2005 | Roohparvar ............ 714/773 |
| 6,847,554 | B2 * | 1/2005 | Satori ............ 365/185.09 |
| 6,985,584 | B1 * | 1/2006 | Yokota et al. ............ 380/200 |
| 2003/0086306 | A1 * | 5/2003 | Takahashi et al. ............ 365/200 |
| 2004/0088636 | A1 * | 5/2004 | Cypher ............ 714/764 |

FOREIGN PATENT DOCUMENTS

JP 2000251484 A * 9/2000

* cited by examiner

*Primary Examiner* — Ajay Bhatia
*Assistant Examiner* — Dipakkumar Gandhi
(74) *Attorney, Agent, or Firm* — John R. Pessetto; W. James Brady; Frederick J. Telecky, Jr.

(57) ABSTRACT

In an embodiment, the invention provides a method for programming flash memory while maintaining a constant error correction term. A data field and forcing bits are arranged in a packing order. Next, all the forcing bits are set to a logical zero value. A first error correction term is generated using the data field and forcing bits as an input to an ECC encoding algorithm. An exclusive OR function is performed on the constant error correction term and the first error correction term creating a difference term. A forcing function is applied to the difference term creating a new value for the forcing bits. The data field and the forcing bits are written to the flash memory.

21 Claims, 4 Drawing Sheets

PACKING ORDER 1

| F | E | D | C | B | A | 9 | 8 | 7 | 6 | 5 | 4 | 3 | 2 | 1 | 0 |
|---|---|---|---|---|---|---|---|---|---|---|---|---|---|---|---|
| 1 | 0 | 7 | 6 | F5 | 5 | 4 | F4 | 3 | BYTE 0 | 1 | 0 | F3 | F2 | F1 | F0 |

| 1F | 1E | 1D | 1C | 1B | 1A | 19 | 18 | 17 | 16 | 15 | 14 | 13 | 12 | 11 | 10 |
|---|---|---|---|---|---|---|---|---|---|---|---|---|---|---|---|
| 0 | BYTE 2 | | | | | | | 7 | 6 | 5 | BYTE 1 | | 2 | F6 |

| 2F | 2E | 2D | 2C | 2B | 2A | 29 | 28 | 27 | 26 | 25 | 24 | 23 | 22 | 21 | 20 |
|---|---|---|---|---|---|---|---|---|---|---|---|---|---|---|---|
| BYTE 4 | | | | | | | | 7 | BYTE 3 | | | | 2 | 1 | F7 |

| 3F | 3E | 3D | 3C | 3B | 3A | 39 | 38 | 37 | 36 | 35 | 34 | 33 | 32 | 31 | 30 |
|---|---|---|---|---|---|---|---|---|---|---|---|---|---|---|---|
| BYTE 6 | | | | | | | | BYTE 5 | | | | | | | |

*FIG. 4*

PACKING ORDER 2

| F | E | D | C | B | A | 9 | 8 | 7 | 6 | 5 | 4 | 3 | 2 | 1 | 0 |
|---|---|---|---|---|---|---|---|---|---|---|---|---|---|---|---|
| BYTE 1 | | | | | | | | BYTE 0 | | | | | | | |

| 1F | 1E | 1D | 1C | 1B | 1A | 19 | 18 | 17 | 16 | 15 | 14 | 13 | 12 | 11 | 10 |
|---|---|---|---|---|---|---|---|---|---|---|---|---|---|---|---|
| BYTE 3 | | | | | | | | BYTE 2 | | | | | | | |

| 2F | 2E | 2D | 2C | 2B | 2A | 29 | 28 | 27 | 26 | 25 | 24 | 23 | 22 | 21 | 20 |
|---|---|---|---|---|---|---|---|---|---|---|---|---|---|---|---|
| BYTE 5 | | | | | | | | BYTE 4 | | | | | | | |

| 3F | 3E | 3D | 3C | 3B | 3A | 39 | 38 | 37 | 36 | 35 | 34 | 33 | 32 | 31 | 30 |
|---|---|---|---|---|---|---|---|---|---|---|---|---|---|---|---|
| FORCING 7:0 | | | | | | | | BYTE 6 | | | | | | | |

*FIG. 5*

PROGRESSIVELY PROGRAMMING FLASH MEMORY WHILE MAINTAINING CONSTANT ERROR CORRECTION CODES

BACKGROUND

Soft errors may occur in integrated circuits (ICs) when radioactive atoms decay and release alpha particles into an IC. Because an alpha particle contains a positive charge and kinetic energy, the alpha particle can hit a memory cell and cause the cell to change from one logical state to the other logical state. For example, when an alpha particle strikes a memory cell, the strike may cause the memory cell to change or "flip" from a logical "one" to a logical "zero." Usually the alpha particle strike does not damage the actual structure of an IC.

A common source of soft errors is alpha particles which may be emitted by trace amounts of radioactive isotopes present in packing materials of integrated circuits. "Bump" material used in flip-chip packaging techniques has also been identified as a possible source of alpha particles.

Other sources of soft errors include high-energy cosmic rays and solar particles. High-energy cosmic rays and solar particles react with the upper atmosphere generating high-energy protons and neutrons that shower to the earth. Neutrons can be particularly troublesome as they can penetrate most man-made construction (a neutron can easily pass through five feet of concrete). Soft errors may also be caused by manufacturing defects. For example, if a defect causes enough leakage on a floating gate of a flash memory cell, the flash memory cell may flip.

Soft errors are becoming one of the main contributors to failure rates in microprocessors and other complex ICs. Several approaches have been suggested to reduce this type of failure. Adding ECC (Error Correction Code) or parity in blocks of memory may reduce this type of failure.

One limitation of flash memory is that although it can be read or programmed a byte (a byte contains 8 bits) or a word at a time in a random access fashion, it must be erased a block of data (e.g. 256K bytes of data) at a time. When a block of data is erased in a flash memory, typically all bits in the block of data are set to a logical one. Any location within an initially erased block of data may be programmed. However, once a bit in the block of data has been written to a logical zero, only by erasing the entire block of data can the bit be changed back to a logical one.

In other words, flash memory offers random access read and programming operations, but cannot offer arbitrary random access rewrite or erase operations. A location may, however, be rewritten as long as the change in the logical value of any bit is from a logical one to a logical zero. For example, a nibble value (i.e. 4 bits) may be erased to a logical value 1111, and then written to a logical value 1110. Successive writes to that nibble can change it to a logical value 1010, then a logical value 0010, and finally a logical value 0000.

In practice few algorithms take advantage of this successive write capability and in general the entire block of data is erased and rewritten at once. Typically the time required to erase a block of data and rewrite it is greater than the time required to read or rewrite bytes of data in a block of data. As a result, the performance of a flash memory may be improved by reducing the number of times a block of data is erased in a flash memory.

BRIEF DESCRIPTION OF THE DRAWINGS

FIG. 4 is a first exemplary embodiment of a packing order for the data field and forcing bits.

FIG. 5 is a second exemplary embodiment of a packing order for the data field and forcing bits.

DETAILED DESCRIPTION

In an embodiment of the invention, forcing bits are added to a data field in order to force a constant ECC value when the data field and the forcing bits are applied to an ECC algorithm. A constant ECC value is desired in a flash memory because having a constant ECC value may reduce the number of times a block of data is caused to be erased. The performance of a flash memory may be improved by reducing the number of times a block of data is erased.

Forcing bits are determined using a forcing function as will be explained in more detail below. In a first exemplary embodiment, the position of the forcing bits may be interspersed between seven data bytes. In this first exemplary embodiment, the forcing bits may also split an individual data byte. In a second exemplary embodiment, the forcing bits may be appended as a last byte on seven other data bytes. The forcing function may be implemented using either hardware or software.

Flash memory stores information in an array of memory cells made from floating-gate transistors. In traditional single-level cell (SLC) devices, each cell stores only one bit of information. Some flash memory, known as multi-level cell (MLC) devices, can store more than one bit per cell by choosing between multiple levels of electrical charge to apply to the floating gates of its cells.

Figure 1:
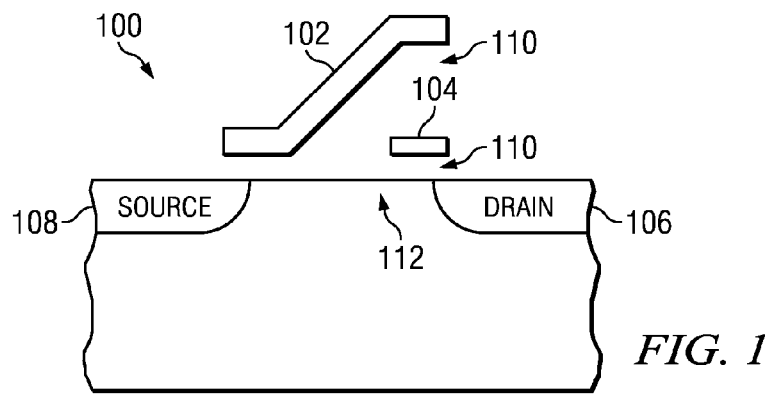
FIG. 1 is a schematic diagram of a side cutaway view of an embodiment of a flash memory cell.

FIG. 1 is a schematic diagram of a side cutaway view of an embodiment of a flash memory cell. In NOR-gate flash memory, each flash memory cell (100) resembles a standard MOSFET (metal-oxide semiconductor field-effect transistor) except the transistor has two gates instead of one. On top is the control gate (102), as in other MOS (metal-oxide semiconductor) transistors, however below the control gate (102) there is a floating gate (104) insulated by an oxide layer (110). The floating gate (104) is interposed between the control gate (102) and the MOSFET channel (112).

Because the floating gate (104) is electrically isolated by the oxide layer (110), any electrons placed on the floating gate (104) are trapped on the floating gate (104). Under normal conditions, the floating gate (104) will not discharge for many years. When the floating gate (104) retains charge, it screens (partially cancels) the electric field from the control gate (102), which modifies the $V_T$ (threshold voltage) of the cell. During read-out, a voltage is applied to the control gate (102), and the MOSFET channel (112) will become conducting or remain insulating, depending on the $V_T$ of the cell, which is in turn controlled by charge on the floating gate (104).

If the MOSFET channel (112) becomes conducting, current flows through the MOSFET channel (112) from the drain (106) to the source (108). The absence or the presence of current flowing through the MOSFET channel (112) may be sensed forming a binary code wherein stored data may be reproduced.

In a multi-level cell device, which stores more than one bit per cell, the amount of current flow is sensed (rather than simply its presence or absence), in order to determine more precisely the level of charge on the floating gate (104).

Flash memory is often used in memory cards and USB flash drives for general storage and transfer of data between computers and other digital products. Flash memory is erased and programmed in large blocks. Because large blocks of memory are subject to soft errors, error correction and error detection techniques are often used to correct and/or detect soft errors in memory.

An Error Correcting Code (ECC) is a code in which data being transmitted or written conforms to specific rules of construction so that departures from this construction in the received or read data may be detected and/or corrected. Some codes can detect a certain number of bit errors and correct a smaller number of bit errors. Codes which can correct one error are termed single error correcting (SEC), and those which detect two are termed double error detecting (DED). A Hamming code, for example, may correct single-bit errors and detect double-bit errors (SEC-DED). More sophisticated codes correct and detect even more errors. Examples of error correction code include Hamming code, Reed-Solomon code, Reed-Muller code and Binary Golay code.

Typically, 64 bytes of memory requires an extra 1 byte of memory in order to implement ECC. This represents an increase in physical memory of 12.5 percent. When implemented at a system level, for example, ECC may require 9 memory ICs (integrated circuits) whereas a system that does not use ECC would only require 8 memory ICs. With this amount of extra memory, ECC may correct a single error and detect a double error.

Figure 2:
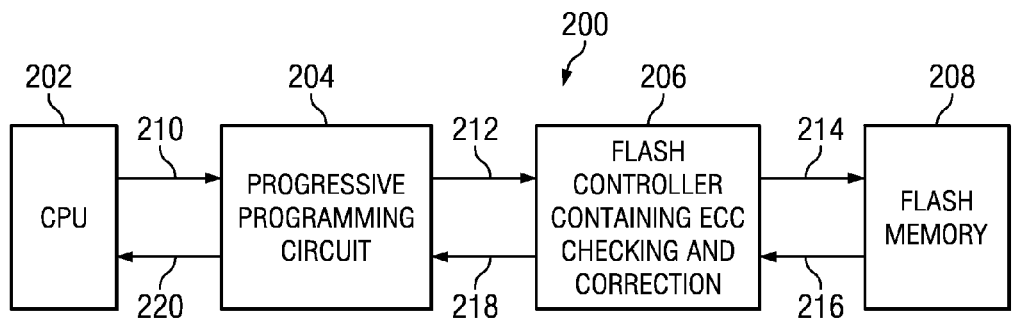
FIG. 2 is a block diagram of an exemplary embodiment of an apparatus for programming flash memory while maintaining a constant error correction term.

FIG. 2 is a block diagram of an exemplary embodiment of an apparatus for programming flash memory while maintaining a constant error correction term. In this exemplary embodiment, a CPU 202 sends a data field via connection 210 to a progressive programming circuit 204. The progressive programming circuit 204 operates on the data field to create a block of data such that when an ECC algorithm operates on the block of data, the error correction term remains a constant. The operation of the progressive programming circuit 204 is explained in more detail below.

The progressive programming circuit 204 then sends the block of data to a flash controller 206 via connection 212. The flash controller 206 operates on the block of data using an ECC algorithm. The ECC algorithm creates the error correction term that remains a constant. Next the flash controller 206 writes the block of data to flash memory 206 via connection 214.

In this exemplary embodiment, reading the block of data from the flash memory 208 starts with the flash controller 206 reading the block of data and the constant error correction term from the flash memory 208 via connection 216. The flash controller 206 then does ECC checking and corrects soft errors where possible. Next the block of data is sent to the progressive programming circuit 204 via connection 218.

When reading the block of data, the block of data must be "unpacked" using the same packing order that was used to write the block of data. After unpacking the block of data, the progressive programming circuit 204 sends the data field to the CPU 202 via connection 220.

Figure 3:
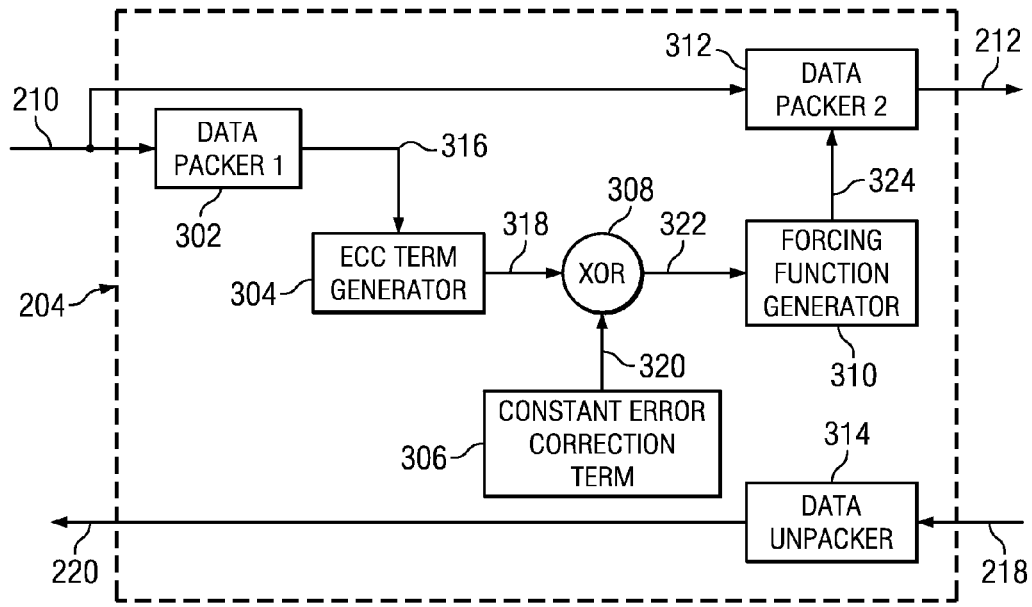
FIG. 3 is a block diagram of an exemplary embodiment of a progressive programming circuit.

FIG. 3 is a block diagram of an exemplary embodiment of a progressive programming circuit 204. In the progressive programming circuit 204, the data field is input to a first data packer 302 via connection 210. FIG. 4 is a first exemplary embodiment of a packing order for the data field and forcing bits. A block of data includes the data field and the forcing bits. In this example of a packing order, forcing bits are dispersed between bytes in the data field and in bytes in the data field. For example forcing bits F5 and F4 are part of byte 0. Also in this example there are seven bytes of data and one byte of forcing bits.

FIG. 5 is a second exemplary embodiment of a packing order for the data field and the forcing bits. A block of data includes the data field and the forcing bits. In this example of a packing order, forcing bits are not dispersed between bytes of the data field or in bytes of the data field. Rather a forcing byte is added before byte 6. Also in this example there are seven bytes of data and one byte of forcing bits.

In FIG. 3, after a packing order is created, the forcing bits are all set to logical zeros. After the forcing bits are all set to logical zeros, the data field along with the forcing bits is sent to the ECC term generator 304 via connection 316. The packing order used is dependent on which ECC encoding algorithm is used. In this exemplary embodiment, the packing order shown in FIG. 4 is used, however the packing order used in FIG. 5 may have also been used. If the packing order in FIG. 5 was used, a different ECC encoding algorithm would also be used.

In this exemplary embodiment, the ECC term generator 304 operates on the data field and the forcing bits using a first ECC encoding algorithm. In this example, the ECC term generator 304 generates a first error correction term. In this example, the first error correction term contains 8 bits (i.e. 1 byte).

In this exemplary embodiment, the first ECC encoding algorithm operates as follows:

bit 0 equals the exclusive OR of input bits 01, 02, 03, 05, 08, 09, 11, 14, 17, 18, 19, 21, 24, 25, 27, 30, 32, 36, 38, 39, 42, 44, 45, 47, 48, 52, 54, 55, 58, 60, 61 and 63;

bit 1 equals the exclusive OR of input bits 00, 01, 02, 04, 06, 08, 10, 12, 16, 17, 18, 20, 22, 24, 26, 28, 32, 33, 34, 36, 38, 40, 42, 44, 48, 49, 50, 52, 54, 56, 58 and 60;

bit 2 equals the exclusive OR of input bits 00, 03, 04, 07, 09, 10, 13, 15, 16, 19, 20, 23, 25, 26, 29, 31, 32, 35, 36, 39, 41, 42, 45, 47, 48, 51, 52, 55, 57, 58, 61, 63 and a logical one;

bit 3 equals the exclusive OR of input bits 00, 01, 05, 06, 07, 11, 12, 13, 16, 17, 21, 22, 23, 27, 28, 29, 32, 33, 37, 38, 39, 43, 44, 45, 48, 49, 53, 54, 55, 59, 60, 61 and a logical one;

bit 4 equals the exclusive OR of input bits 02, 03, 04, 05, 06, 07, 14, 15, 18, 19, 20, 21, 22, 23, 30, 31, 34, 35, 36, 37, 38, 39, 46, 47, 50, 51, 52, 53, 54, 55, 62, 63 and a logical one;

bit 5 equals the exclusive OR of input bits 08, 09, 10, 11, 12, 13, 14, 15, 24, 25, 26, 27, 28, 29, 30, 31, 40, 41, 42, 43, 44, 45, 46, 47, 56, 57, 58, 59, 60, 61, 62, 63 and a logical one;

bit 6 equals the exclusive OR of input bits 00, 01, 02, 03, 04, 05, 06, 07, 24, 25, 26, 27, 28, 29, 30, 31, 32, 33, 34, 35, 36, 37, 38, 39, 56, 57, 58, 59, 60, 61, 62, 63 and a logical one;

bit 7 equals the exclusive OR of input bits 00, 01, 02, 03, 04, 05, 06, 07, 24, 25, 26, 27, 28, 29 30, 31, 40, 41, 42, 43, 44, 45, 46, 47, 48, 49, 50, 51, 52, 53, 54, 55 and a logical one.

If the second exemplary embodiment of the packing order shown in FIG. 5 is used, a second encoding algorithm is needed. The second ECC encoding algorithm operates as follows:

bit 0 equals the exclusive OR of input bits 01, 04, 08, 10, 11, 12, 14, 17, 18, 20, 23, 28, 30, 31, 34, 36, 37, 39, 40, 44, 46, 47, 50, 52, 53, 55, 57, 58, 59, 60, 61 and 63;

bit 1 equals the exclusive OR of input bits 00, 02, 05, 06, 10, 11, 13, 15, 17, 19, 21, 25, 26, 28 30, 32, 34, 36, 40, 41, 42, 44, 46, 48, 50, 52, 56, 57, 58, 60, 62 and 63;

bit 2 equals the exclusive OR of input bits 00, 03, 04, 05, 07, 09, 12, 13, 16, 18, 19, 22, 24, 27, 28, 31, 33, 34, 37, 39, 40, 43, 44, 47, 49, 50, 53, 55, 56, 59, 62, 63 and a logical one;

bit 3 equals the exclusive OR of input bits 01, 02, 03, 06, 07, 10, 14, 15, 16, 20, 21, 22, 25, 29, 30, 31, 35, 36, 37, 40, 41, 45, 46, 47, 51, 52, 53, 56, 57, 61, 62, 63 and a logical one;

bit 4 equals the exclusive OR of input bits 00, 01, 02, 03, 08, 09, 11, 12, 13, 14, 15, 16, 23, 24, 26, 27, 28, 29, 30, 31, 38, 39, 42, 43, 44, 45, 46, 47, 54, 55, 58, 59 and a logical one;

bit 5 equals the exclusive OR of input bits 04, 05, 06, 07, 08, 09, 17, 18, 19, 20, 21, 22, 23, 24, 32, 33, 34, 35, 36, 37, 38, 39, 48, 49, 50, 51, 52, 53, 54, 55, 60, 61 and a logical one;

bit 6 equals the exclusive OR of input bits 00, 01, 02, 03, 17, 18, 19, 20, 21, 22, 23, 24, 25, 26, 27, 28, 29, 30, 31, 48, 49, 50, 51, 52, 53, 54, 55, 56, 57, 58, 59, 63 and a logical one;

bit 7 equals the exclusive OR of input bits 00, 01, 02, 03, 17, 18, 19, 20, 21, 22, 23, 24, 32, 33, 34, 35, 36, 37, 38, 39, 40, 41, 42, 43, 44, 45, 46, 47, 56, 57, 58, 59 and a logical one.

The last logical one in bits 2-7 is a parity term. The ECC term generator 304 does not include this parity term so the ECC term generator output 318 does not use the last logical one in bits 2 to 7. The Flash controller 206 does include this parity term.

The first error correction term via connection 318 and the constant error correction term 306 via connection 320 is input to an exclusive OR function 308. In this example, the constant error correction term contains 8 bits (i.e. 1 byte). The value of the constant error correction term 306, in this example, is a hexadecimal value FC. The hexadecimal value FC was determined after a data field containing all logical ones was input to the ECC encoding algorithm. Typically, a flash memory is initialized to all logical ones. The exclusive OR function 308 outputs a difference term, 8 bits in this example, via connection 322.

The difference term created by the exclusive OR function 308 is operated on by the forcing function generator 310. A first exemplary embodiment of the logic for the forcing function generator is show in Table 1 below.

TABLE 1

| | Difference term | | | | | | | | |
|---|---|---|---|---|---|---|---|---|---|
| Fx | D7 | D6 | D5 | D4 | D3 | D2 | D1 | D0 | 1 |
| F0 | 0 | 1 | 1 | 0 | 0 | 0 | 0 | 1 | 0 |
| F1 | 1 | 1 | 1 | 1 | 0 | 0 | 0 | 1 | 0 |
| F2 | 0 | 0 | 1 | 0 | 1 | 0 | 1 | 0 | 0 |
| F3 | 0 | 0 | 1 | 1 | 1 | 0 | 1 | 0 | 1 |
| F4 | 1 | 1 | 1 | 0 | 0 | 1 | 1 | 1 | 0 |
| F5 | 1 | 1 | 0 | 0 | 0 | 1 | 1 | 1 | 1 |
| F6 | 1 | 0 | 0 | 1 | 1 | 1 | 1 | 1 | 0 |
| F7 | 1 | 1 | 0 | 0 | 0 | 0 | 0 | 0 | 0 |

In this example shown in Table 1, forcing bit F0 is the exclusive of the difference term bits D6, D5 and D0. In this example shown in Table 1, forcing bit F2 is the exclusive of the difference term bits D5, D3 and D1. Also in this example shown in Table 1, forcing bit F7 is the exclusive OR of the difference term bits D7 and D6.

Figure 6:
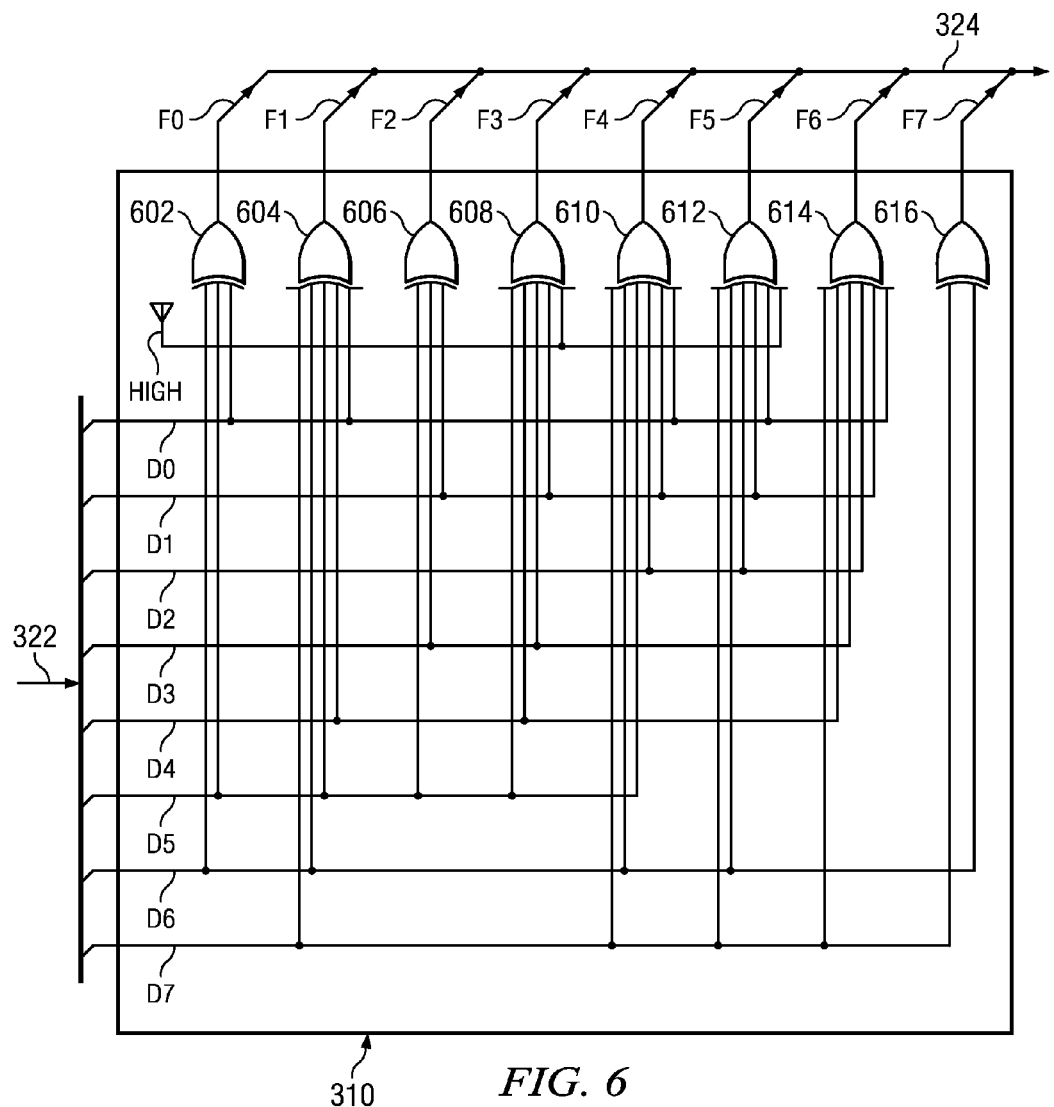
FIG. 6 is a schematic drawing of an exemplary embodiment of a forcing function generator.

A second exemplary embodiment of the logic for the forcing function generator 310 is shown in FIG. 6. In FIG. 6, eight exclusive ORs 602-616 are used to implement the logic shown in Table 1. The inputs to each of the eight exclusive ORs, 602-616, are selected from the eight values, D0-D7, provided by the difference term and a signal, HIGH, a logical one.

For example difference bits D6, D5, and D0 provide the three inputs for exclusive OR 602. The output of exclusive OR 602 is the value of forcing bit F0. For example difference bits D5, D3 and D1 provide the three inputs for exclusive OR 606. The output of exclusive OR 606 is the value of forcing bit F2. Also, for example, difference bits D7 D6 630 provide the two inputs for exclusive OR 616. The output of exclusive OR 616 is the value of forcing bit F7. Forcing bits F7-F0 from forcing function generator 310 are connected to data packer 2, 312, via connection 324.

In this exemplary embodiment the forcing bits and the data field are combined into the packing order defined in FIG. 4. The forcing bits are changed to the values created by the forcing function generator 310. In this example, the forcing bits and the data field in the packing order defined in FIG. 4 are sent via connection 212 to the Flash Controller 206. The packing order used is dependent on which ECC encoding algorithm is used. In this exemplary embodiment, the packing order shown in FIG. 4 is used, however the packing order used in FIG. 5 may have also been used. If the packing order in FIG. 5 was used, a second ECC encoding algorithm would also be used.

The ECC encoding algorithm in the Flash Controller 206 then generates the constant error correction term. Because the error correction term generated by the ECC encoding algorithm in the Flash Controller 206 remains constant, the error correction term on the flash memory 208 is not changed when writing a new data field to the flash memory 208.

Figure 7:
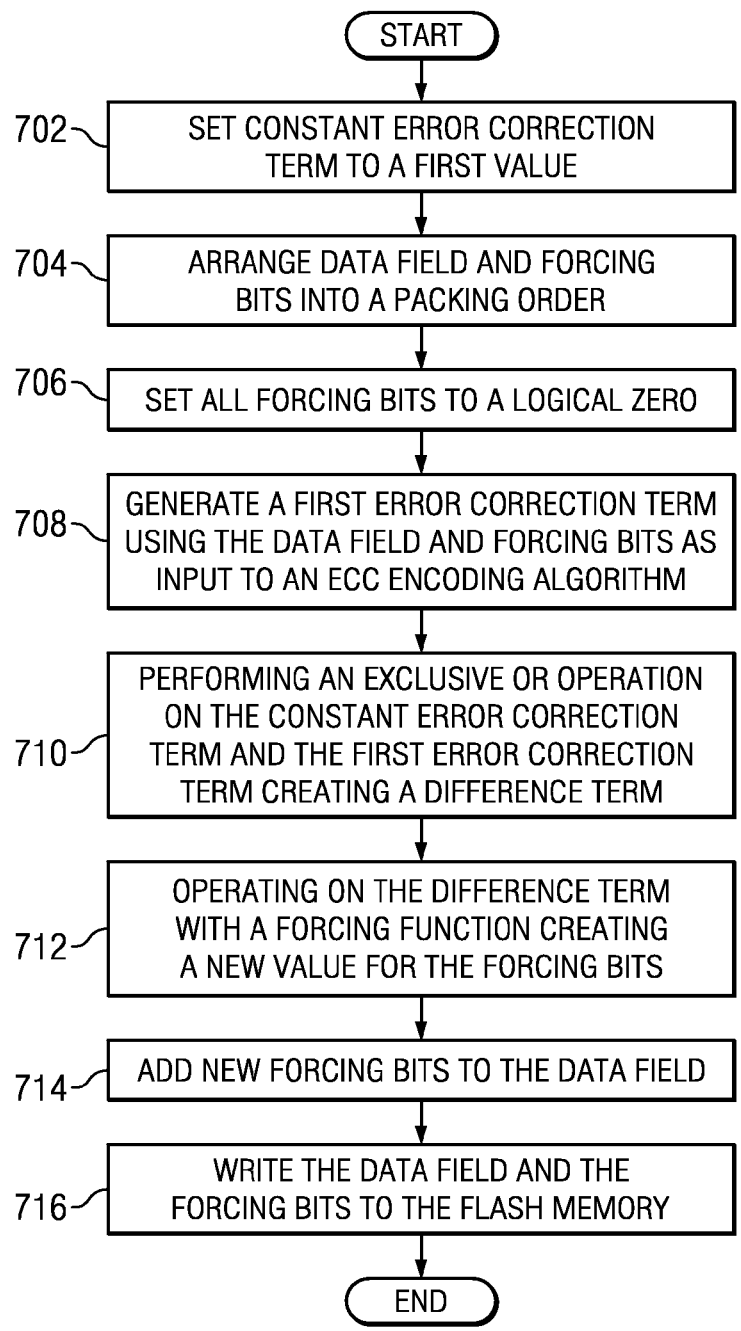
FIG. 7 is a flow diagram illustrating an embodiment of a method for programming flash memory while maintaining a constant error correction term.

FIG. 7 is a flow diagram illustrating an embodiment of a method for programming flash memory while maintaining a constant error correction term. In FIG. 7, box 702 indicates that a constant error correction term is set to a first value. In box 704, data field and forcing bits are arranged into a packing order. Next, in box 706, all forcing bits are set to a logical zero. Box 708 indicates that a first error correction term is generated using the data field and forcing bits as input to an ECC encoding algorithm.

After the first error correction term has been generated, box 710 indicates that an exclusive OR operation is performed on the first error correction term and the constant error correction term generating a difference term. Box 712 indicates that a forcing function operates on the difference term to create a new value for the forcing bits. Next box 714 indicates the new value of the forcing bits is added to the data field in the previously defined packing order. Box 716 indicates that the data field and the forcing bits in the previously defined packing order are written to the flash memory.

The foregoing description has been presented for purposes of illustration and description. It is not intended to be exhaustive or to limit the invention to the precise form disclosed, and other modifications and variations may be possible in light of the above teachings. The exemplary embodiments were chosen and described in order to best explain the applicable principles and their practical application to thereby enable others skilled in the art to best utilize various embodiments and various modifications as are suited to the particular use contemplated. It is intended that the appended claims be construed to include other alternative embodiments except insofar as limited by the prior art.

What is claimed is:

1. A method for programming flash memory while maintaining a constant error correction term, the method comprising:

setting the constant error correction term to a first value;
arranging a data field and forcing bits into a packing order;
setting all the forcing bits to a logical zero;
generating a error correction term using the data field and the forcing bits as input to an ECC encoding algorithm;

performing an exclusive OR operation on the constant error correction term and the error correction term creating a difference term;

applying a forcing function to the difference term creating a new value for the forcing bits;

arranging the data field and the forcing bits with the new value into the packing order;

writing the data field and the forcing bits into the flash memory.

2. The method as in claim 1 wherein the data field comprises seven data bytes, the forcing bits comprise 1 byte, the constant error correction term comprises 1 byte and the error correction term comprises 1 byte.

3. The method as in claim 2 wherein the error correction term generated by a first ECC encoding algorithm comprises:

bit 0 equal to an exclusive OR of input bits 01, 02, 03, 05, 08, 09, 11, 14, 17, 18, 19, 21, 24, 25, 27, 30, 32, 36, 38, 39, 42, 44, 45, 47, 48, 52, 54, 55, 58, 60, 61 and 63;

bit 1 equal to an exclusive OR of input bits 00, 01, 02, 04, 06, 08, 10, 12, 16, 17, 18, 20, 22, 24, 26, 28, 32, 33, 34, 36, 38, 40, 42, 44, 48, 49, 50, 52, 54, 56, 58 and 60;

bit 2 equal to an exclusive OR of input bits 00, 03, 04, 07, 09, 10, 13, 15, 16, 19, 20, 23, 25, 26, 29, 31, 32, 35, 36, 39, 41, 42, 45, 47, 48, 51, 52, 55, 57, 58, 61 and 63;

bit 3 equal to an exclusive OR of input bits 00, 01, 05, 06, 07, 11, 12, 13, 16, 17, 21, 22, 23, 27, 28, 29, 32, 33, 37, 38, 39, 43, 44, 45, 48, 49, 53, 54, 55, 59, 60 and 61;

bit 4 equal to an exclusive OR of input bits 02, 03, 04, 05, 06, 07, 14, 15, 18, 19, 20, 21, 22, 23, 30, 31, 34, 35, 36, 37, 38, 39, 46, 47, 50, 51, 52, 53, 54, 55, 62 and 63;

bit 5 equal to an exclusive OR of input bits 08, 09, 10, 11, 12, 13, 14, 15, 24, 25, 26, 27, 28, 29, 30, 31, 40, 41, 42, 43, 44, 45, 46, 47, 56, 57, 58, 59, 60, 61, 62 and 63;

bit 6 equal to an exclusive OR of input bits 00, 01, 02, 03, 04, 05, 06, 07, 24, 25, 26, 27, 28, 29, 30, 31, 32, 33, 34, 35, 36, 37, 38, 39, 56, 57, 58, 59, 60, 61, 62 and 63;

bit 7 equal to an exclusive OR of input bits 00, 01, 02, 03, 04, 05, 06, 07, 24, 25, 26, 27, 28, 29 30, 31, 40, 41, 42, 43, 44, 45, 46, 47, 48, 49, 50, 51, 52, 53, 54 and 55.

4. The method as in claim 3 wherein the first value of the constant error correction value is a hexadecimal value FC.

5. The method of claim 3 wherein the packing order of the data field and the forcing bits comprises:

byte zero from msb (most significant bit) to lsb (least significant bit) filling positions D:C, A:9, 7:4 respectively;

byte one from msb (most significant bit) to lsb (least significant bit) filling positions 16:11, F:E respectively;

byte two from msb (most significant bit) to lsb (least significant bit) filling positions 1E:17 respectively;

byte three from msb (most significant bit) to lsb (least significant bit) filling 27:21, 1F respectively;

byte four from msb (most significant bit) to lsb (least significant bit) filling 2F:28 respectively;

byte five from msb (most significant bit) to lsb (least significant bit) filling 37:30 respectively;

byte six from msb (most significant bit) to lsb (least significant bit) filling 3F:38 respectively;

the forcing bits from msb (most significant bit) to lsb (least significant bit) filling 20, 10, B, 8, 3-0;

wherein values for the positions in the packing order are hexadecimal values.

6. The method as in claim 3 wherein the forcing function is a look-up table.

7. The method of claim 3 wherein the forcing bits created by the forcing function comprise:

forcing bit zero equal to a logical exclusive OR of difference bit six, difference bit five and difference bit 0 forcing bit one equal to the logical exclusive OR of difference bit seven, the difference bit six, the difference bit five, difference bit four and the difference bit zero;

forcing bit two equal to the logical exclusive OR of the difference bit five, difference bit three and difference bit one;

forcing bit three equal to the logical exclusive OR of the difference bit five, the difference bit four, the difference bit three, the difference bit one and a logical one;

forcing bit four equal to the logical exclusive OR of the difference bit seven, the difference bit six, the difference bit five, difference bit two, the difference bit one and the difference bit zero;

forcing bit five equal to the logical exclusive OR of the difference bit seven, the difference bit six, the difference bit two, the difference bit one, the difference bit zero and a logical one;

forcing bit six equal to the logical exclusive OR of the difference bit seven, the difference bit four, the difference bit three, the difference bit two, the difference bit one and the difference bit zero;

forcing bit seven equal to the logical exclusive OR of the difference bit seven and the difference bit six.

8. The method as in claim 2 wherein the error correction term generated by a second ECC encoding algorithm comprises:

bit 0 equal to an exclusive OR of input bits 01, 04, 08, 10, 11, 12, 14, 17, 18, 20, 23, 28, 30, 31, 34, 36, 37, 39, 40, 44, 46, 47, 50, 52, 53, 55, 57, 58, 59, 60, 61 and 63;

bit 1 equal to an exclusive OR of input bits 00, 02, 05, 06, 10, 11, 13, 15, 17, 19, 21, 25, 26, 28 30, 32, 34, 36, 40, 41, 42, 44, 46, 48, 50, 52, 56, 57, 58, 60, 62 and 63;

bit 2 equal to an exclusive OR of input bits 00, 03, 04, 05, 07, 09, 12, 13, 16, 18, 19, 22, 24, 27, 28, 31, 33, 34, 37, 39, 40, 43, 44, 47, 49, 50, 53, 55, 56, 59, 62 and 63;

bit 3 equal to an exclusive OR of input bits 01, 02, 03, 06, 07, 10, 14, 15, 16, 20, 21, 22, 25, 29, 30, 31, 35, 36, 37, 40, 41, 45, 46, 47, 51, 52, 53, 56, 57, 61, 62 and 63;

bit 4 equal to an exclusive OR of input bits 00, 01, 02, 03, 08, 09, 12, 13, 14, 15, 16, 23, 24, 26, 27, 28, 29, 30, 31, 38, 39, 42, 43, 44, 45, 46, 47, 54, 55, 58 and 59;

bit 5 equal to an exclusive OR of input bits 04, 05, 06, 07, 08, 09, 17, 18, 19, 20, 21, 22, 23, 24, 32, 33, 34, 35, 36, 37, 38, 39, 48, 49, 50, 51, 52, 53, 54, 55, 60 and 61;

bit 6 equal to an exclusive OR of input bits 00, 01, 02, 03, 17, 18, 19, 20, 21, 22, 23, 24, 25, 26, 27, 28, 29, 30, 31, 48, 49, 50, 51, 52, 53, 54, 55, 56, 57, 58, 59 and 63;

bit 7 equal to an exclusive OR of input bits 00, 01, 02, 03, 17, 18, 19, 20, 21, 22, 23, 24, 32, 33, 34, 35, 36, 37, 38, 39, 40, 41, 42, 43, 44, 45, 46, 47, 56, 57, 58 and 59.

9. The method of claim 8 wherein the packing order comprises:

byte zero from msb (most significant bit) to lsb (least significant bit) filling positions 7:0 respectively;

byte one from msb (most significant bit) to lsb (least significant bit) filling positions F:8 respectively;

byte two from msb (most significant bit) to lsb (least significant bit) filling positions 17:10 respectively;

byte three from msb (most significant bit) to lsb (least significant bit) filling 1F:18 respectively;

byte four from msb (most significant bit) to lsb (least significant bit) filling 27:20 respectively;

byte five from msb (most significant bit) to lsb (least significant bit) filling 2F:28 respectively;

byte six from msb (most significant bit) to lsb (least significant bit) filling 37:30 respectively;
the forcing bits from msb (most significant bit) to lsb (least significant bit) filling 3F:38;
wherein values for the positions in the packing order are hexadecimal values.

10. A circuit for programming flash memory while maintaining a constant error correction term, the circuit comprising:
a first data packer having an input and an output;
an ECC term generator having an input and an output;
an exclusive OR having a first input, a second input and an output;
a forcing function generator having an input and an output;
a second data packer having a first input, a second input and an output;
wherein a data field is input to the input of the first data packer;
wherein the first data packer arranges the data field and forcing bits into a packing order;
wherein the output of the first data packer sends the data field and the forcing bits in the packing order to the input of the ECC term generator;
wherein the ECC term generator fills all the forcing bits with logical zeros;
wherein the ECC term generator creates an error correction term at the output of the ECC term generator using an ECC encoding algorithm;
wherein the error correction term is presented at the first input of the exclusive OR;
wherein the constant error correction term is presented at the second input of the exclusive OR;
wherein a difference term is created by the exclusive OR at the output of the exclusive OR;
wherein the difference term is presented at the input of the forcing function generator;
wherein the forcing function generator creates a new value for the forcing bits at the output of the forcing function generator;
wherein the forcing bits with the new value are presented at the first input of the second data packer;
where the data field is presented at the second input of the second data packer;
wherein the data field and the forcing bits with the new value are output from the output of the second data packer to a flash controller;
wherein the flash controller writes the data field and the forcing bits to the flash memory.

11. The circuit as in claim 10 wherein the data field comprises seven data bytes, the forcing bits comprise 1 byte, the constant error correction term comprises 1 byte and the first error correction term comprises 1 byte.

12. The circuit as in claim 11 wherein the error correction term generated by a first ECC encoding algorithm comprises:
bit 0 equal to an exclusive OR of input bits 01, 02, 03, 05, 08, 09, 11, 14, 17, 18, 19, 21, 24, 25, 27, 30, 32, 36, 38, 39, 42, 44, 45, 47, 48, 52, 54, 55, 58, 60, 61 and 63;
bit 1 equal to an exclusive OR of input bits 00, 01, 02, 04, 06, 08, 10, 12, 16, 17, 18, 20, 22, 24, 26, 28, 32, 33, 34, 36, 38, 40, 42, 44, 48, 49, 50, 52, 54, 56, 58 and 60;
bit 2 equal to an exclusive OR of input bits 00, 03, 04, 07, 09, 10, 13, 15, 16, 19, 20, 23, 25, 26, 29, 31, 32, 35, 36, 39, 41, 42, 45, 47, 48, 51, 52, 55, 57, 58, 61 and 63;
bit 3 equal to an exclusive OR of input bits 00, 01, 05, 06, 07, 11, 12, 13, 16, 17, 21, 22, 23, 27, 28, 29, 32, 33, 37, 38, 39, 43, 44, 45, 48, 49, 53, 54, 55, 59, 60 and 61;
bit 4 equal to an exclusive OR of input bits 02, 03, 04, 05, 06, 07, 14, 15, 18, 19, 20, 21, 22, 23, 30, 31, 34, 35, 36, 37, 38, 39, 46, 47, 50, 51, 52, 53, 54, 55, 62 and 63;
bit 5 equal to an exclusive OR of input bits 08, 09, 10, 11, 12, 13, 14, 15, 24, 25, 26, 27, 28, 29, 30, 31, 40, 41, 42, 43, 44, 45, 46, 47, 56, 57, 58, 59, 60, 61, 62 and 63;
bit 6 equal to an exclusive OR of input bits 00, 01, 02, 03, 04, 05, 06, 07, 24, 25, 26, 27, 28, 29, 30, 31, 32, 33, 34, 35, 36, 37, 38, 39, 56, 57, 58, 59, 60, 61, 62 and 63;
bit 7 equal to an exclusive OR of input bits 00, 01, 02, 03, 04, 05, 06, 07, 24, 25, 26, 27, 28, 29 30, 31, 40, 41, 42, 43, 44, 45, 46, 47, 48, 49, 50, 51, 52, 53, 54 and 55.

13. The circuit as in claim 12 wherein the first value of the constant error correction value is a hexadecimal value FC.

14. The circuit as in claim 12 wherein the packing order of the data field and the forcing bits comprises:
byte zero from msb (most significant bit) to lsb (least significant bit) filling positions D:C, A:9, 7:4 respectively;
byte one from msb (most significant bit) to lsb (least significant bit) filling positions 16:11, F:E respectively;
byte two from msb (most significant bit) to lsb (least significant bit) filling positions 1E:17 respectively;
byte three from msb (most significant bit) to lsb (least significant bit) filling 27:21, 1F respectively;
byte four from msb (most significant bit) to lsb (least significant bit) filling 2F:28 respectively;
byte five from msb (most significant bit) to lsb (least significant bit) filling 37:30 respectively;
byte six from msb (most significant bit) to lsb (least significant bit) filling 3F:38 respectively;
the forcing bits from msb (most significant bit) to lsb (least significant bit) filling 20, 10, B, 8, 3-0;
wherein values for the positions in the packing order are hexadecimal values.

15. The circuit as in claim 12 wherein the forcing function is a look-up table.

16. The circuit of claim 12 wherein the forcing bits created by the forcing function generator comprise:
forcing bit zero equal to logical exclusive OR of difference bit six, difference bit five and difference bit 0
forcing bit one equal to the logical exclusive OR of difference bit seven, the difference bit six, the difference bit five, difference bit four and the difference bit zero;
forcing bit two equal to the logical exclusive OR of the difference bit five, difference bit three and difference bit one;
forcing bit three equal to the logical exclusive OR of the difference bit five, the difference bit four, the difference bit three, the difference bit one and a logical one;
forcing bit four equal to the logical exclusive OR of the difference bit seven, the difference bit six, the difference bit five, difference bit two, the difference bit one and the difference bit zero;
forcing bit five equal to the logical exclusive OR of the difference bit seven, the difference bit six, the difference bit two, the difference bit one, the difference bit zero and a logical one;
forcing bit six equal to the logical exclusive OR of the difference bit seven, the difference bit four, the difference bit three, the difference bit two, the difference bit one and the difference bit zero;
forcing bit seven equal to the logical exclusive OR of the difference bit seven and the difference bit six.

17. An apparatus for programming flash memory while maintaining a constant error correction term, the apparatus comprising:

at least one non-transitory computer readable medium; and
a non-transitory computer readable program code stored on said at least one non-transitory computer readable medium, said non-transitory computer readable program code comprising instructions for:
setting the constant error correction term to a first value;
arranging a data field and forcing bits into a packing order;
setting all the forcing bits to a logical zero;
generating a first error correction term using the data field and the forcing bits as input to an ECC encoding algorithm;
performing an exclusive OR operation on the constant error correction term and the first error correction term creating a difference term;
applying a forcing function to the difference term creating a new value for the forcing bits;
arranging the data field and the forcing bits with the new value into the packing order;
writing the data field and the forcing bits into the flash memory.

18. The apparatus as in claim 17 wherein the data field comprises seven data bytes, the forcing bits comprise 1 byte, the constant error correction term comprises 1 byte and the first error correction term comprises 1 byte.

19. The apparatus as in claim 18 wherein the error correction term generated by a first ECC encoding algorithm comprises:
bit 0 equal to an exclusive OR of input bits 01, 02, 03, 05, 08, 09, 11, 14, 17, 18, 19, 21, 24, 25, 27, 30, 32, 36, 38, 39, 42, 44, 45, 47, 48, 52, 54, 55, 58, 60, 61 and 63;
bit 1 equal to an exclusive OR of input bits 00, 01, 02, 04, 06, 08, 10, 12, 16, 17, 18, 20, 22, 24, 26, 28, 32, 33, 34, 36, 38, 40, 42, 44, 48, 49, 50, 52, 54, 56, 58 and 60;
bit 2 equal to an exclusive OR of input bits 00, 03, 04, 07, 09, 10, 13, 15, 16, 19, 20, 23, 25, 26, 29, 31, 32, 35, 36, 39, 41, 42, 45, 47, 48, 51, 52, 55, 57, 58, 61 and 63;
bit 3 equal to an exclusive OR of input bits 00, 01, 05, 06, 07, 11, 12, 13, 16, 17, 21, 22, 23, 27, 28, 29, 32, 33, 37, 38, 39, 43, 44, 45, 48, 49, 53, 54, 55, 59, 60 and 61;
bit 4 equal to an exclusive OR of input bits 02, 03, 04, 05, 06, 07, 14, 15, 18, 19, 20, 21, 22, 23, 30, 31, 34, 35, 36, 37, 38, 39, 46, 47, 50, 51, 52, 53, 54, 55, 62 and 63;
bit 5 equal to an exclusive OR of input bits 08, 09, 10, 11, 12, 13, 14, 15, 24, 25, 26, 27, 28, 29, 30, 31, 40, 41, 42, 43, 44, 45, 46, 47, 56, 57, 58, 59, 60, 61, 62 and 63;
bit 6 equal to an exclusive OR of input bits 00, 01, 02, 03, 04, 05, 06, 07, 24, 25, 26, 27, 28, 29, 30, 31, 32, 33, 34, 35, 36, 37, 38, 39, 56, 57, 58, 59, 60, 61, 62 and 63;
bit 7 equal to an exclusive OR of input bits 00, 01, 02, 03, 04, 05, 06, 07, 24, 25, 26, 27, 28, 29 30, 31, 40, 41, 42, 43, 44, 45, 46, 47, 48, 49, 50, 51, 52, 53, 54 and 55.

20. The apparatus as in claim 19 wherein the packing order of the data field and the forcing bits comprises:
byte zero from msb (most significant bit) to lsb (least significant bit) filling positions D:C, A:9, 7:4 respectively;
byte one from msb (most significant bit) to lsb (least significant bit) filling positions 16:11, F:E respectively;
byte two from msb (most significant bit) to lsb (least significant bit) filling positions 1E:17 respectively;
byte three from msb (most significant bit) to lsb (least significant bit) filling 27:21, 1F respectively;
byte four from msb (most significant bit) to lsb (least significant bit) filling 2F:28 respectively;
byte five from msb (most significant bit) to lsb (least significant bit) filling 37:30 respectively;
byte six from msb (most significant bit) to lsb (least significant bit) filling 3F:38 respectively;
the forcing bits from msb (most significant bit) to lsb (least significant bit) filling 20, 10, B, 8, 3-0;
wherein values for the positions in the packing order are hexadecimal values.

21. The apparatus of claim 19 wherein the forcing bits created by the forcing function comprise:
forcing bit zero equal to logical exclusive OR of difference bit six, difference bit five and difference bit 0
forcing bit one equal to the logical exclusive OR of difference bit seven, the difference bit six, the difference bit five, difference bit four and the difference bit zero;
forcing bit two equal to the logical exclusive OR of the difference bit five, difference bit three and difference bit one;
forcing bit three equal to the logical exclusive OR of the difference bit five, the difference bit four, the difference bit three, the difference bit one and a logical one;
forcing bit four equal to the logical exclusive OR of the difference bit seven, the difference bit six, the difference bit five, difference bit two, the difference bit one and the difference bit zero;
forcing bit five equal to the logical exclusive OR of the difference bit seven, the difference bit six, the difference bit two, the difference bit one, the difference bit zero and a logical one;
forcing bit six equal to the logical exclusive OR of the difference bit seven, the difference bit four, the difference bit three, the difference bit two, the difference bit one and the difference bit zero;
forcing bit seven equal to the logical exclusive OR of the difference bit seven and the difference bit six.

* * * * *